R. A. BEST.
TIRE RIM TOOL.
APPLICATION FILED MAR. 8, 1916.
1,211,663.
Patented Jan. 9, 1917.
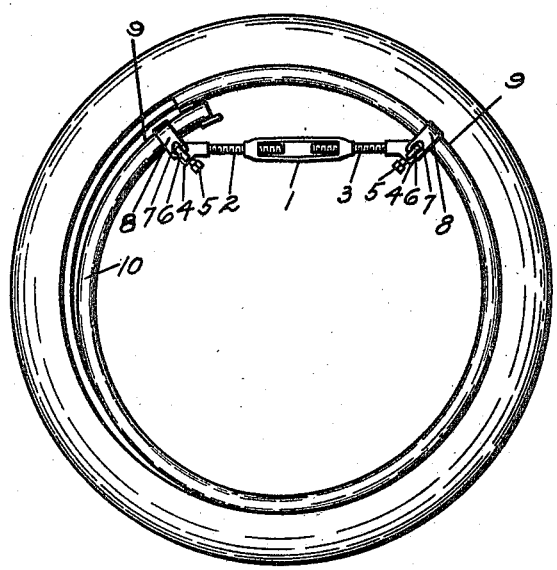
Fig. I.
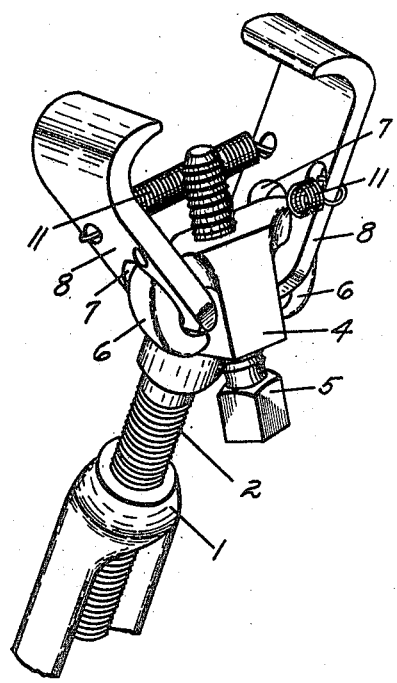
Fig. II.
WITNESSES:
Morris Stimson
Lenn Gilman
INVENTOR.
Robert A. Best
BY Chappell & Earl
ATTORNEYS.

UNITED STATES PATENT OFFICE.

ROBERT A. BEST, OF GRAND RAPIDS, MICHIGAN.

TIRE-RIM TOOL.

1,211,663.  Specification of Letters Patent.  Patented Jan. 9, 1917.

Application filed March 8, 1916. Serial No. 82,976.

*To all whom it may concern:*

Be it known that I, ROBERT A. BEST, a citizen of the United States, residing at Grand Rapids, Michigan, have invented certain new and useful Improvements in Tire-Rim Tools, of which the following is a specification.

This invention relates to an improved tire rim tool, which is used for contracting and expanding a demountable split rim for an automobile or other tire.

The main objects of this invention are: First, to make an improved rim tool which will expeditiously expand or contract a split demountable rim when the tire is to be removed from or replaced therein. Second, to provide in such a tool an improved rim engaging means.

Further objects and objects relating to details and economies of construction and operation will definitely appear from the detailed description to follow.

I accomplish the objects of my invention by the devices and means described in the following specification.

The invention is clearly defined and pointed out in the claims.

A structure which is a preferred embodiment of my invention, is clearly illustrated in the accompanying drawing, forming a part of this specification, in which:

Figure I is a side elevation of my improved tire rim tool showing the same in operative position with the rim in its contracted position. Fig. II is an enlarged detail perspective view of the rim engaging means at one end of my rim tool showing the construction of the same.

In the drawing, similar reference characters refer to similar parts throughout the several views.

Referring to the drawing, 1 is a right and left hand turn-buckle, in the opposite ends of which screw the right and left handed turn-buckle rods 2 and 3, respectively. The outer ends of these rods are formed into a suitable head portion 4, the main axis of which is angularly disposed to the axes of the said rods. Axially through the center of each head is set screw 5. From the sides of the said head also extend a pair of outwardly and rearwardly curved hook eyes 6. A pair of rim hooks 8, each containing an elongated perforation 7 are carried on said eyes 6. The elongated perforations 7 give freedom of movement on said eyes. These rim hooks serve to grab the bead portion 9 of a split demountable rim 10. The springs 11, 11 connect the two hooks of each pair and serve to hold the same in a yieldingly engaging contact with the rim 10. The set screw 5 is then turned up until the hooks are drawn tight.

From this construction, it is seen that one pair of hooks is placed on the rim near the joint thereof and the springs 11 will serve to yieldingly position and properly locate the hooks, and the opposite pair of hooks are disposed on the opposite side of the joint. The set screws 5 are then screwed against the inside face of the rim and the same will tighten the hooks 8 securely. If the turn-buckle is then turned in a right handed direction, the rods will be drawn in toward each other and the rim will thereby be contracted, as seen in Fig. I, and the tire may then be easily removed. After the tire has been replaced on the contracted rim, a left handed turning of the turn-buckle will expand or force the rim outwardly until the ends of the same will be in a position to be secured or locked. The tool may then be removed by loosening set screws 5. The hooks 8, however, will remain engaged if the parts are not absolutely clamped owing to the fact that they are pivoted and will clamp or engage the rim by their toggle action, which is of high consequence whether the screw 5 is turned absolutely tight or not.

I have illustrated and described my improvements in detail in the form in which I have embodied the same for the market. I have not attempted to illustrate or describe possible modifications and variations in structural details, which I contemplate, as I believe the disclosure made will enable those skilled in the art to embody my improvements as conditions may require. By holding the hooks in place until the set screw is tightened, the springs can be omitted. They are very useful, however. I desire to be understood as claiming my improvements specifically in the form illustrated, as well as broadly, as appears in the appended claims.

Having thus described my invention, what I claim as new and desire to secure by Letters Patent is:

1. In a tire rim tool, the combination of a right and left hand turn buckle and rods, a head at the end of each turn buckle rod angularly disposed to the axes thereof, a set screw axially disposed in each head and angularly disposed to the axes of the said rods, a pair of laterally disposed and rearwardly curved hook eyes projecting from each head, pairs of oppositely disposed rim hooks loosely engaging the said hook eyes of each head, and spring means for holding the said rim hooks yieldingly in engagement with the said rim, coacting for the purpose specified.

2. In a tire rim tool, the combination of a right and left hand turn buckle and rods, a head at the end of each turn buckle rod, a set screw axially disposed in each head and angularly disposed to the axes of the said rods, a pair of laterally disposed hook eyes projecting from each head, and pairs of oppositely disposed rim hooks loosely engaging the said hook eyes of each head, coacting for the purpose specified.

In witness whereof, I have hereunto set my hand and seal in the presence of two witnesses.

ROBERT A. BEST. [L. S.]

Witnesses:
ALICE M. O'DONNELL,
CLARE J. HALL.